(12) United States Patent
Dutrop (10) Patent No.: US 9,140,380 B2
(45) Date of Patent: Sep. 22, 2015

(54) VALVE ASSEMBLY

(75) Inventor: Aymeric Dutrop, Lyons (FR)

(73) Assignee: BAYARD SAS (FR)

( * ) Notice: Subject to any disclaimer, the term of this patent is extended or adjusted under 35 U.S.C. 154(b) by 299 days.

(21) Appl. No.: 13/522,188

(22) PCT Filed: Jan. 12, 2011

(86) PCT No.: PCT/EP2011/000103
§ 371 (c)(1),
(2), (4) Date: Sep. 13, 2012

(87) PCT Pub. No.: WO2011/085974
PCT Pub. Date: Jul. 21, 2011

(65) Prior Publication Data
US 2013/0025723 A1    Jan. 31, 2013

(30) Foreign Application Priority Data

Jan. 13, 2010  (EP) .................................... 10290015

(51) Int. Cl.
| F16K 47/08 | (2006.01) |
| F16K 25/04 | (2006.01) |
| F16K 47/04 | (2006.01) |

(52) U.S. Cl.
CPC ................. *F16K 47/08* (2013.01); *F16K 25/04* (2013.01); *F16K 47/04* (2013.01); *Y10T 137/86734* (2015.04); *Y10T 137/86759* (2015.04)

(58) Field of Classification Search
CPC ........... F16K 1/54; F16K 47/08; F16K 47/04; Y10T 137/86734; Y10T 137/86759
See application file for complete search history.

(56) References Cited

U.S. PATENT DOCUMENTS

| 1,307,986 | A | * | 6/1919 | Randall et al. ............ 137/625.39 |
| 1,859,876 | A | * | 5/1932 | Koplin ........................ 137/625.3 |
| 4,080,982 | A |   | 3/1978 | Maezawa |
| 4,473,210 | A | * | 9/1984 | Brighton ........................ 251/127 |
| 7,028,712 | B2 | * | 4/2006 | Wears et al. .............. 137/625.33 |
| 7,073,532 | B2 | * | 7/2006 | Bowe ........................ 137/625.33 |

(Continued)

FOREIGN PATENT DOCUMENTS

| DE | 2423749 A1 | 11/1975 |
| EP | 0591873 A1 | 10/1993 |
| EP | 1794483 B1 | 5/2011 |

(Continued)

OTHER PUBLICATIONS

European International Search Report for PCT/EP2011/000103, Dated Apr. 26, 2011, 3 pages.

(Continued)

*Primary Examiner* — John Fox
(74) *Attorney, Agent, or Firm* — Brooks Kushman P.C.

(57) ABSTRACT

A valve assembly, in particular a reducing valve assembly, comprises a first energy dissipating means with a plurality of apertures, a second energy dissipating means with a plurality of apertures and a valve closing means for opening and closing the valve assembly. The geometry of the plurality of apertures of the first energy dissipating means and the geometry of the plurality of the apertures of the second energy dissipating means is such that independently of the opening state of the valve assembly, the pressure drops at the first and second energy dissipating means are better balanced to be able to reduce the effect of cavitation on the housing of the valve assembly.

24 Claims, 4 Drawing Sheets

(56) References Cited

U.S. PATENT DOCUMENTS 7,152,628 B2 * 12/2006 Folk et al. ............... 137/625.33
7,234,489 B2 *  6/2007 Bowe et al. ................. 137/813

FOREIGN PATENT DOCUMENTS

| GB | 2034863 | A  | 6/1980  |
|----|---------|----|---------|
| SU | 945547  | A1 | 7/1982  |
| WO | 8503557 | A1 | 8/1985  |
| WO | 02084154 | A1 | 10/2002 |
| WO | 04001260 | A1 | 12/2003 |

OTHER PUBLICATIONS

Russian Office Action Dated Oct. 10, 2014, Application No. 2012130173/06(047435), 6 pages.

* cited by examiner

VALVE ASSEMBLY

CROSS-REFERENCE TO RELATED APPLICATIONS

This application is a U.S. national phase of PCT Application No. PCT/EP2011/000103 filed Jan. 12, 2011, which claims priority to European Application No. 10290015.6 filed Jan. 13, 2010, the disclosures of which are incorporated in their entirety by reference herein.

TECHNICAL FIELD

The present invention relates to a valve assembly for use in a high pressure fluid transfer system that is protected against the effect of cavitation that can arise in the case of large upstream/downstream pressure differences.

BACKGROUND

When a fluid passes through a valve, it gains speed in the area where the cross section is reduced. Since the energy, according to Bernouilli's law, is conserved, the rise in kinetic energy generates a drop in the pressure energy. The latter then rises again when the passage cross section rises again, thereby reducing the speed of the fluid.

Hence, in standard regulation valves, the pressure can locally drop by a large amount and reach values that are smaller than the vaporization pressure. When this happens, water can vaporize and small gas bubbles may build up. The rise in pressure or the contact with a surface then leads to an implosion of these bubbles, which is a highly energetic phenomenon in terms of pressure and temperature which can lead to the surrounding solid matter being torn apart. According to the extent of the cavitation phenomenon, the erosion taking place on the downstream part of the valve body can be very quick and the destruction of the apparatus can take only a few weeks.

The implosion of the gas bubbles also generates a particularly large noise, which can be a problem for the neighbourhood if the apparatus is installed in an urban area or close to homes.

Consequently, when a valve is intended to be used in an application characterized by a large pressure difference, it is necessary to provide a regulation valve that is adapted to withstand such a large pressure difference.

Some technical solutions existing on the market consist in letting the fluid flow through planar or cylindrical surfaces, which may be provided with circular openings or slots. Some of these devices are designed so as to obtain several energy dissipation stages with the intention to distribute the pressure drop within the apparatus over the various stages to thereby reduce the appearance of the phenomenon of cavitation and the associated noise disturbances.

Such an anti-cavitation valve assembly is known from the published European patent application EP 1 794 483. The disclosed valve assembly for reducing cavitation includes a seat disposed within a valve housing intermediate a fluid inlet and outlet thereof. A disc guide is associated with the seat so as to be slidably movable relative to the seat. The seat includes a wall defining an inner chamber and having elongated slots formed therein so as to direct fluid towards the central portion of the fluid chamber. The disc guide includes a wall having elongated slots formed on an upper portion thereof and a non-slotted lower portion configured to substantially occlude the elongated slots of the seat when the disc guide is moved into a closed position. The seat furthermore includes an upper non-slotted wall portion to occlude the slots of the disc guide in the closed position. The device disclosed in the above mentioned published European patent application is constructed in such a way that two successive energy dissipations take place. A first pressure drop occurs when the fluid from the fluid inlet enters the seat through the elongated slots of the seat. Cavitation which may occur within the seat usually cannot harm the valve housing, since it is contained within the seat. The seat, however, can be configured as a spare part and easily exchanged. A second pressure drop occurs when the fluid leaves the seat through the elongated slots of the upper part of the disc guide towards the fluid outlet. Cavitation which may occur in this area may seriously and quickly damage the valve housing and lead to its complete destruction.

It appears, however, that this known valve assembly cannot guarantee the distribution of load loss over the various stages over the whole opening range of the valve assembly. For values of the valve opening that are smaller than 50%, which represents a typical range of this type of devices, most of the pressure drop takes place at the output of the disc guide. As a consequence, cavitation can occur and this in a critical area, since cavitation will occur in an area where the valve housing can be damaged. Hence, the prior art valve assembly is not efficiently protected against the cavitation phenomenon at small valve openings and the service life of the valve assembly is, therefore, adversely affected.

Another problem of the valve assembly disclosed in the above mentioned published European patent application is that the parts of the valve assembly have a rather complex shape. Indeed, the elongated slots of the disc guide are formed at an offset angle other than 90° with respect to the disc guide wall, in order to direct the fluid passing through the elongated slots towards the housing of the valve assembly at a non-direct angle. These non-radially oriented slots prevent the fluid stream from directly hitting the walls of the valve assembly upon leaving the disc guide. This specific orientation of the elongated slots renders the method of manufacturing the parts considerably more complex, which leads to higher manufacturing costs. Further, it renders the method of assembling the valve assembly more complex, as it requires an angular indexation of the disc guide within the seat. An imprecise mounting of the disc guide within the seat may also have consequences on the performance of the system.

SUMMARY

It is therefore the object of the present invention is to provide a valve assembly, where the pressure drop through the valve assembly is suitably distributed within the valve assembly, so as to efficiently protect the valve assembly against cavitation.

According to a first aspect, the invention relates to a valve assembly, in particular a reducing valve assembly, comprising: a first energy dissipating means with a plurality of apertures for reducing the pressure of a fluid from a first pressure to a second lower pressure, a second energy dissipating means with a plurality of apertures for reducing the fluid pressure from the second pressure to a third pressure lower than the second pressure, and a valve closing means for opening and closing the valve, wherein the valve closing means is further configured to continuously or gradually occlude the plurality of apertures of the first energy dissipating means when closing the valve, and the geometry of the plurality of apertures of the first energy dissipating means is such that when closing the valve, the open passage of the apertures of the first energy dissipating means decreases faster than the opening degree of the total valve assembly at least for a predetermined range of opening degrees of the total valve assembly including the closed state, in particular in a range of 0% to 10%, more in particular in a range of 0% to 30% of the total opening degree of the valve assembly. At small openings of the valve assembly, the fluid is thus forced to pass through reduced openings compared to a situation in which the decrease of the open passage reduces linearly with the opening degree of the valve assembly, like is the case in the prior art described above. As a consequence the pressure drop at the first energy dissipating stage is increased. As a consequence, the amount of cavitations created downstream the second energy dissipating means can be reduced thus increasing the lifetime of the valve assembly. In this context, the term "opening degree" relates to the, typically linear, displacement of the valve closing means with respect to the first energy dissipating means, which can for instance be realized by a stem configured to move the valve closing means from an open into a closed position.

The apertures can have an elongated shape. Such stages can be fabricated more easily compared to circular geometries and furthermore the ratio of open areas through which a fluid can pass, to the remaining area of the stage is higher.

Preferably, the first energy dissipating means can comprise a valve seat comprising: a bottom wall, a circumferential wall extending upwardly from the bottom wall and defining an inner chamber, and a plurality of slots formed in a lower part of the circumferential wall, wherein at least one slot has a smaller width in its lower part than in its upper part.

Further preferred, the lower part of the at least one slot can be formed as an arc, preferentially a parabolic arc, or has a trapezoidal shape and/or the upper part of the at least one slot can have an essentially rectangular shape. For these kinds of shapes the pressure drop distribution can be further optimized.

Preferably, the corners of the at least one slot are rounded and/or the edges of the at least one slit on the exterior and/or interior side of the circumferential wall can be rounded. This improves the flow of the fluid through the valve assembly and increases the valve's $K_v$ value. Here, the $K_v$ value is the volume flow in cubic meter/hour of water at the temperature between 5°-40° C. with a pressure drop across the valve of one bar, when the valve is completely opened.

The object of the invention is also achieved with the valve assembly according to claim 7. According to this second aspect, the valve assembly, in particular a valve assembly as described above, comprises: a first energy dissipating means with a plurality of apertures for reducing the pressure of a fluid from a first pressure to a second lower pressure, a second energy dissipating means with a plurality of apertures for reducing the fluid pressure from the second pressure to a third pressure lower than the second pressure, and a valve closing means for opening and closing the valve, wherein the valve closing means comprises a first wall element configured to continuously or gradually occlude the plurality of apertures provided in a second wall element of the second energy dissipating means when closing the valve, wherein the first and second wall elements are configured and arranged such that in the closed state of the valve assembly a clearance is formed between the first and second wall element. When the valve assembly opens, the clearance provided between the first and second wall elements facilitates the passage of a fluid through the second energy dissipating means towards the exit of the valve assembly, which therefore reduces the pressure in the area between the first and second energy dissipating means thus increases the pressure drop at the first energy dissipating means and reduces the pressure drop at the second energy dissipating means. The fluid leaves the second energy dissipating means at lower speed thus limits the apparition of cavitation.

According to a preferred embodiment, the clearance can be provided over the entire circumference of the first energy dissipating means.

Advantageously, the second energy dissipating means can be formed as a disc guide comprising: a top wall, a circumferential wall extending downwardly from the top wall and defining an inner chamber, and a plurality of slots as apertures formed in an upper part of the circumferential wall.

According to a preferred realisation, the circumference of the circumferential wall extending downwardly from the top wall is smaller in an upper part than in its lower part to provide the clearance. By simply chipping or bending the upper part of the circumferential wall, it thus becomes possible to achieve the advantageous design providing the clearance. As an alternative the circumferential wall extending upwardly from the bottom wall of the first energy dissipating means can have a circumference in its upper part that is larger than its lower part to thereby provide the clearance.

Preferably, the slots of the second energy dissipating means can be formed such that they extend perpendicular with respect to the circumferential wall. With the design of the first and second energy dissipating means ensuring a large pressure drop at the first stage, the risk of cavitation downstream the second energy dissipating means is reduced, thus no special arrangement with respect to the cutting direction of the apertures in the circumferential wall is necessary. This simplifies the fabrication process of the second energy dissipating means and the assembly of the valve assembly, as no complicated machining and special alignment is necessary with respect to the housing of the valve assembly.

Advantageously, the circumferential wall of the valve seat can comprise a non-slotted upper part and/or the circumferential wall of the valve disc guide comprises a non-slotted lower part, wherein the non-slotted upper and lower part form the valve closing means. Thus no additional element needs to be provided which simplifies the design and assembly of the valve.

According to a preferred embodiment, the non-slotted lower part of the circumferential wall has a rounded extremity on its interior side, preferentially according to an arc of a circle. When the valve assembly Is in an open state, the fluid having passed the apertures of the first energy dissipating means then have to pass along the circumferential wall of the second energy dissipating means. By providing a rounded extremity, facilitate the flow around the extremity and improve the $K_v$ value.

Advantageously, the valve assembly as described above can further comprise a housing with a fluid inlet and a fluid outlet, wherein the valve seat is arranged between the fluid inlet and the fluid outlet and fixed to the housing, the valve disc guide is slidably arranged in the valve seat, and the non-slotted lower part of the circumferential wall of the valve disc guide is adapted to substantially occlude the plurality of slots of the seat in a closed position of the valve assembly, thereby preventing fluid from passing from the fluid inlet to the fluid outlet, and the non-slotted upper part of the circumferential wall of the valve seat is adapted to substantially occlude the plurality of slots of the valve disc guide in a closed position of the valve assembly, to thereby prevent fluid from passing from the fluid inlet to the fluid outlet, and the disc guide is slidably movable into an open position of the valve assembly, thereby letting fluid through the valve assembly from the fluid inlet to the fluid outlet. With this valve assembly a balanced pressure drop distribution can be observed over the two stages thereby preventing cavitation to occur in the vicinity of the housing on the fluid outlet side of the assembly.

Preferably, the slots of the disc guide can be wider than the slots of the seat. This further improves the pressure drop distribution between first and second energy dissipating means.

According to a third aspect of the invention, the invention also relates to a valve assembly, in particular as described above, comprising: a first energy dissipating means with a plurality of apertures for reducing the pressure of a fluid from a first pressure to a second lower pressure, a second energy dissipating means with a plurality of apertures for reducing the fluid pressure from the second pressure to a third pressure lower than the second pressure, and a valve closing means for opening and closing the valve, characterized in that the geometry of the plurality of apertures of the first energy dissipating means and the geometry of the second energy dissipating means around its apertures is such that independently of the opening state of the valve assembly, the pressure drop at the first energy dissipating means is at least 50%, preferably in a range of 50% to 70%.

It is the finding of the invention, that it is the shape of the apertures of the first energy dissipating means and the special geometry around the apertures of the second energy dissipating means that allows a better distribution of the pressure drop between the first and second energy dissipating means, such that even for a nearly closed valve assembly, the pressure drop at the first means is still at least 50% thereby reducing the occurrence of cavitation at the exit of the second stage which is in contrast to the prior art.

In the following, the features and properties of an embodiment according the invention will be described in detail with respect to the figures.

DETAILED DESCRIPTION

Figure 1A:
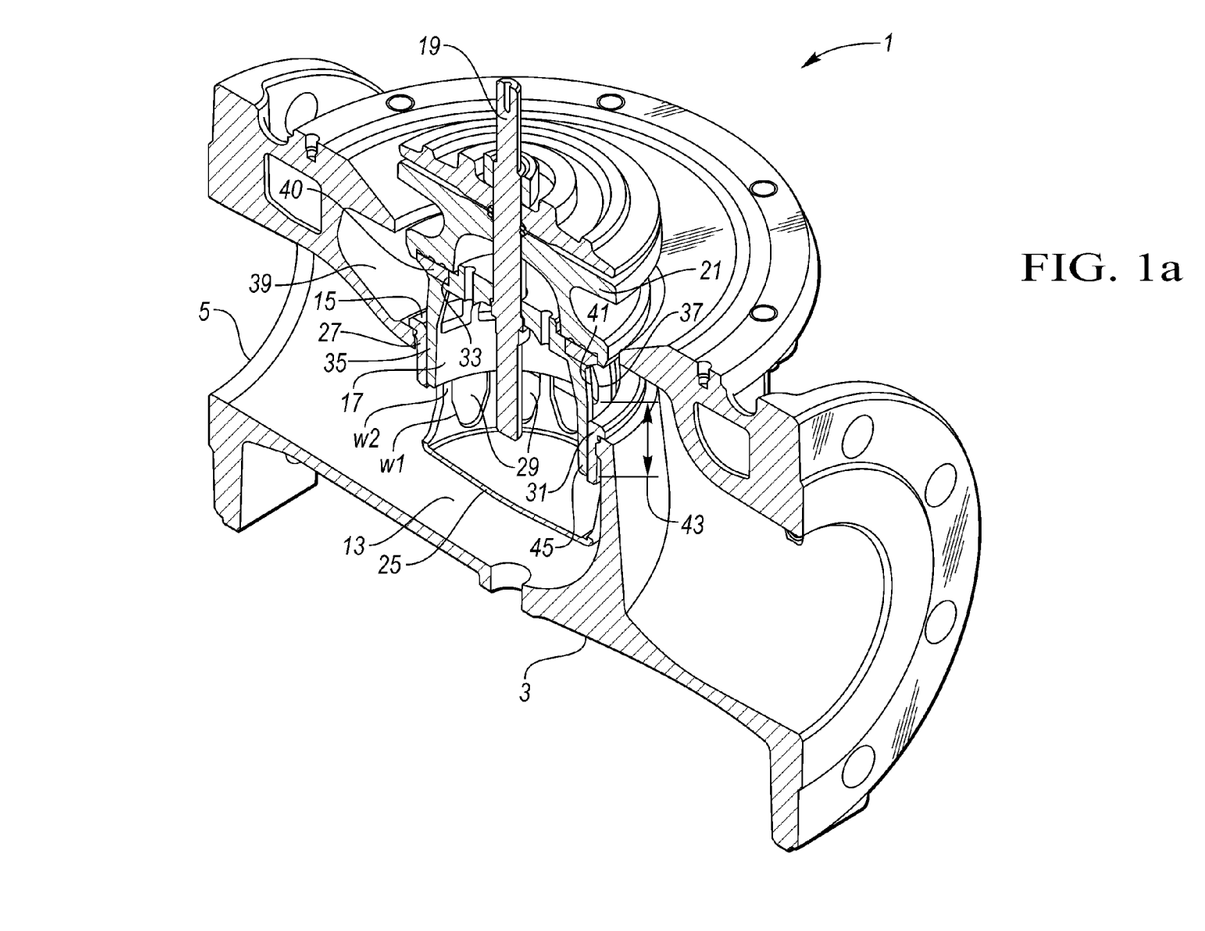
FIGS. 1a and 1b show a schematic three dimensional partially cut representation of a valve assembly according to the invention in two different opening states.

FIG. 1a illustrates a 3D cut view of a valve assembly according to the invention. The valve assembly 1 according to the invention is a so-called reducing valve assembly used to reduce the pressure of a fluid passing through the valve assembly 1. The valve assembly 1 comprises a housing 3 with a fluid inlet 5 and a fluid outlet 7. The housing 3 can be closed using a cover wherein, for instance, bolts are used to fix the cover to the housing 3. In this valve assembly 1, a fluid under high pressure enters the valve assembly 1 via the inlet 5 and leaves the valve assembly 1 at a lower pressure via outlet 7.

To achieve the desired pressure drop, the valve assembly 1 comprises a first energy dissipating means 13 and a second energy dissipating means 15. In the following, the first energy dissipating means 13 will also be called a valve seat and the second energy dissipating means 15 a valve disc guide. The first and second energy dissipating means 13, 15 are arranged such that they can move relatively with respect to each other. A valve closing means 17 is used for opening and closing the valve. In FIG. 1, the valve assembly 1 is illustrated in a fully open state. To close the valve assembly 1, a stem 19 is used. The stem 19 is connected to the second energy dissipating means 15 and is configured to move the second energy dissipating means 15 together with a holding element 21 and a diaphragm (not shown) downwards. A spring (not shown) can be used to bias the second energy dissipating means 15 into the first energy dissipating means 13 in the closed position of the valve assembly 1.

The first energy dissipating means 13 comprises a bottom wall 25, a circumferential wall 27 extending upwardly from the bottom wall 25 thereby defining an inner chamber which is open to the top. A plurality of apertures 29 are formed in the lower part of the circumferential wall 27. According to a first aspect of the invention, the apertures 29 have an elongated shape with the long side essentially perpendicular to the bottom wall 25. According to the invention, they are shaped such that their width, e.g. W1, in the lower part is smaller than their width, e.g. W2, in the upper part.

The part of the apertures 29 that is smaller in width can have an arc shape, like a parabolic arc shape, or can be trapezoidal in shape. The upper part with the larger width is preferably rectangular. In this embodiment, the shape of the apertures 29 is symmetric, but according to further variants asymmetric shapes are also possible, as long as the upper part is wider than the lower part. To improve the flow through the apertures 29, the corners of the apertures are rounded.

In this embodiment, the apertures 29 of the first energy dissipating means 13 all have the same shape and are furthermore equally distributed around the circumferential wall 27. However, according to variants of the embodiment, the shapes of the various apertures 29 might vary as long as the ratio between cut out regions and plain regions in areas of the circumferential wall 27 where apertures are arranged is smaller in the lower part compared to the upper part.

The first energy dissipating means 13 furthermore comprises at its upper extremities, a rim region 31 via which the first energy dissipating means 13 is attached to the housing 3.

The second energy dissipating means 15 comprises a top wall 33 attached to the holding element 21 and a circumferential wall 35 extending downwardly from the top wall 33 to form a inner chamber which is open towards the bottom wall 25 of the first energy dissipating means 13. The circumferential wall 35, comprises a plurality of apertures 37 in its upper part. The lower part of the circumferential wall 35 forms a part of the valve closing means 17. The outer circumference of the circumferential wall 35 of the second energy dissipating means 15 is chosen such that it can be moved within the chamber defined by the circumferential wall 27 of the first energy dissipating means 13. Typically, the dimensions of the exterior wall of the circumferential wall 35 and the interior wall of the circumferential wall 27 are mated, except for the area close to the top wall 33. The second energy dissipating means 15 also comprises a rim 39 with a seal 40 mounted between the holding element 21 and the upper end of the circumferential wall 35 to ensure tightness when the valve assembly is completely closed. Indeed the seal 40 comes to a rest on the upper extremity of the circumferential wall 27 of the first energy dissipating means 13 in the closed state of the valve assembly.

According to a second aspect of the invention, the circumferential wall 35 is configured such that in the upper region 41, its outer circumference is smaller than in its lower region 43, thereby providing a clearance between the first and second energy dissipating means 13 and 15. In an alternative realisation of this aspect of the invention, the circumferential wall 35 could have straight geometry whereas the inner circumference of the wall 27 could be larger in its upper part than in its lower part.

According to another aspect, the lower extremity 45 of the circumferential wall 35 has a rounded shape on its interior side, typically in the shape of an arc of a circle.

The apertures 37 of the second energy dissipating means 15 are essentially rectangular shaped, with rounded corners. Here, their width is slightly smaller than the width of the apertures 29 of the first energy dissipating means 13, but could also be the same or larger. Their height (length) is of the same order as the one of the apertures 29 or slightly shorter, for example by about 3 to 5 mm. Typically, their height corresponds to the distance between the completely open and fully closed state.

Like in case of the first energy dissipating means 13, the apertures 37 of the second energy dissipating means 15 are also equally distributed over the circumferential wall 35 and furthermore, all have the same shape. Again, without departing from the scope of invention, different shapes and sizes concerning the apertures 37 could be provided instead.

Figure 1B:
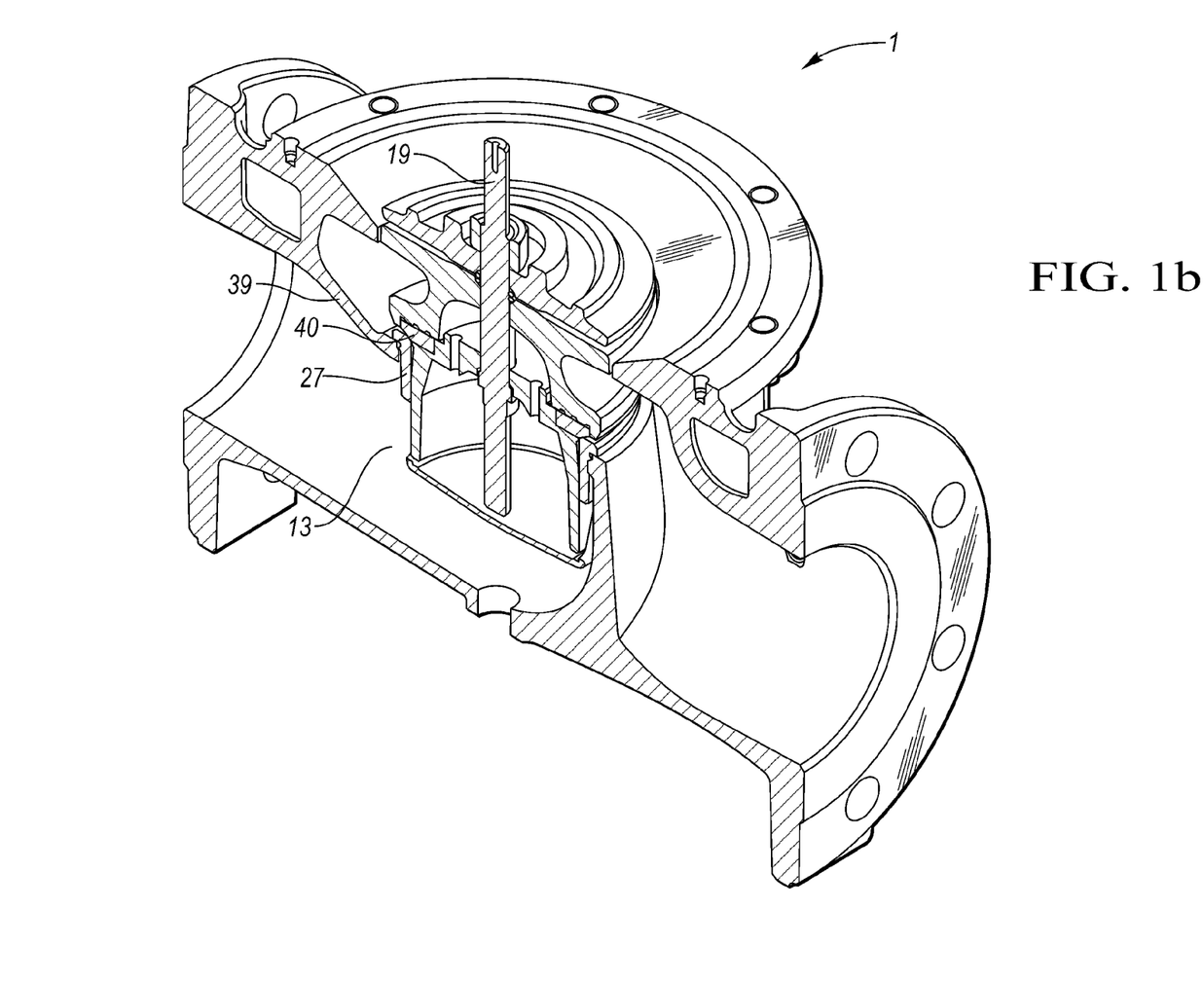

In the embodiment illustrated in FIG. 1, both the apertures of the first as well as of the second energy dissipating means 13, 15 are cut perpendicular with respect to the surface of the circumferential walls 27, 35.

The valve assembly 1 as illustrated in FIG. 1 functions in the following way. When a fluid at a high pressure, e.g. 25 bar, enters the valve assembly 1 via the inlet 5, a pressure drop occurs at the first energy dissipating means. Indeed, the first energy dissipating means forms an obstacle as the fluid can only pass via the apertures 29, thereby provoking a pressure drop to a second lower pressure. The fluid which has entered the inner chamber defined by the bottom wall 25 and the circumferential wall 27 of the first energy dissipating means 13 then moves upwards and reaches the second energy dissipating means 15. A second pressure drop from the second to a third pressure level occurs when the fluid has to pass through the apertures 37 of the second energy dissipating means 15. The fluid having passed the second energy dissipating means 15 then leaves the valve assembly 1 via the outlet 7.

The two-stage design of the valve assembly 1 has the advantage, that the pressure drop can be distributed over the first and second stage, so that the cavitation effect, as described in detail in the introduction, can be suppressed or at least reduced.

To close the valve assembly 1, the stem 19 is used to lower the second energy dissipating means 15 into the chamber defined by the first energy dissipating means 13. When moving downwards, the plane part 17 without apertures of the circumferential wall 35 of the second energy dissipating means 15 starts to partially occlude the apertures 29 of the first energy dissipating means 13. At the same time, the apertures 37 of the second energy dissipating means 15 become partially occluded by a plane part 47, being part of the valve closing means, of the circumferential wall 27 of the first energy dissipating means 13 arranged in the area above the apertures 29. Thus, In the two-stage design, when closing the valve, both the apertures of the first and the second energy dissipating means 13 & 15 become more and more occluded to thereby limit the flow through the valve assembly 1.

FIG. 1b illustrates the valve assembly 1 in the completely closed state. The stem 19 is lowered such that the rim 39 and the seal 40 come to a rest on the circumferential wall 27 of the first energy dissipating means 13.

The design of the first energy dissipating means 13 as well as of the second energy dissipating means 15 help to overcome the problems which have been observed in the prior art as described in detail in the introduction. Whereas in the prior art, the load loss distribution was no longer well distributed within the valve assembly for valves that are nearly closed (less than 30%), in the design according to the invention, the pressure drop at the first energy dissipating means is, independently of the degree of opening of the valve assembly, in a range between 50% and 70%. Thus, even in the nearly closed state, the amount of cavitations that can occur after the second energy dissipating means 15 is reduced to thereby improve the lifetime of the valve assembly.

The effect of the design of the first and second energy dissipating means 13 and 15 on the pressure drop, will now be explained in detail.

Figure 2A:
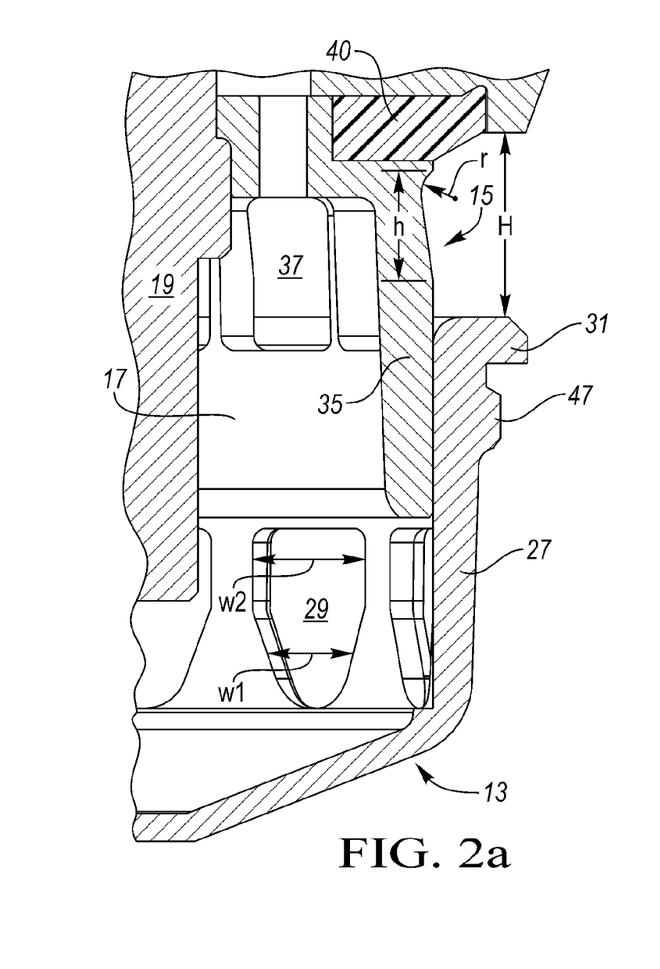
FIGS. 2a to 2d illustrate a perspective cross-sectional view of a part of a first and second energy dissipating means according to the present invention as well as the shape of the open passage of apertures of the first energy dissipating means for various opening degrees of the valve assembly.

FIG. 2a illustrates a 3-dimensional partial cut view of the first and second energy dissipating means 13 and 15 in the valve assembly fully open state. As can be seen, the plane part 17 of the circumferential wall 35 as well as the plane part 47 of the circumferential wall 27 are adjacent to each other such, that the apertures 29 and 37 of the first and second energy dissipating means 13 and 15 are completely open. On the exterior side and towards the rim 31 the circumferential wall 27 has a thickened area carrying a thread used to fix the first energy dissipating means 13 to the housing 3.

Figure 2B:
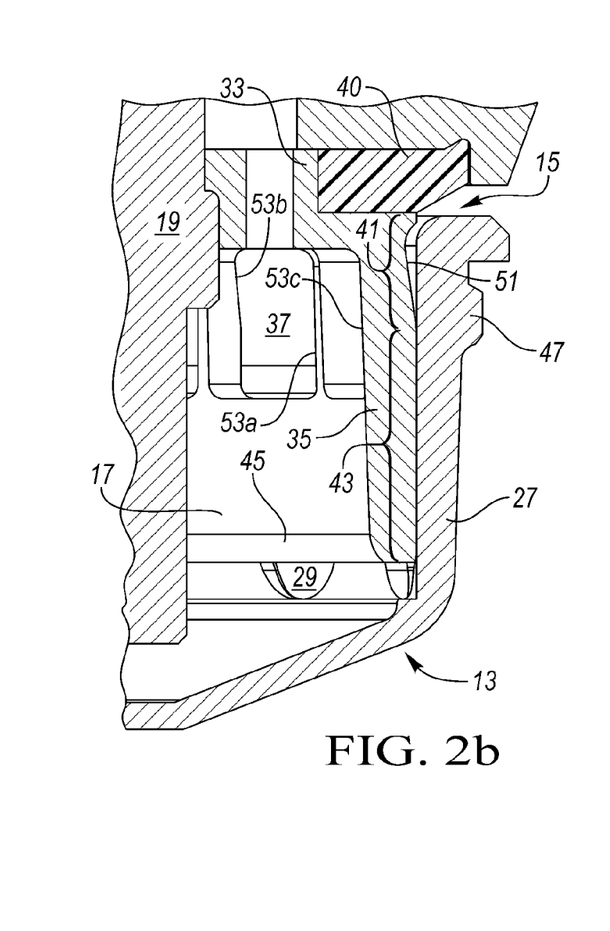

FIG. 2b illustrates the same partial view of the first and second energy dissipating means 15 and 13 in the state of the valve assembly 1 being nearly closed (approximately 10 to 20%). As can be clearly seen, the plane part 17 being part of the valve closing means now partially occludes the apertures 29 of the first energy dissipating means 13 and the plane part 47, also being part of the valve closing means, of the first energy dissipating means 13 partially occludes the apertures 37 of the second energy dissipating means 15.

Figure 2C:
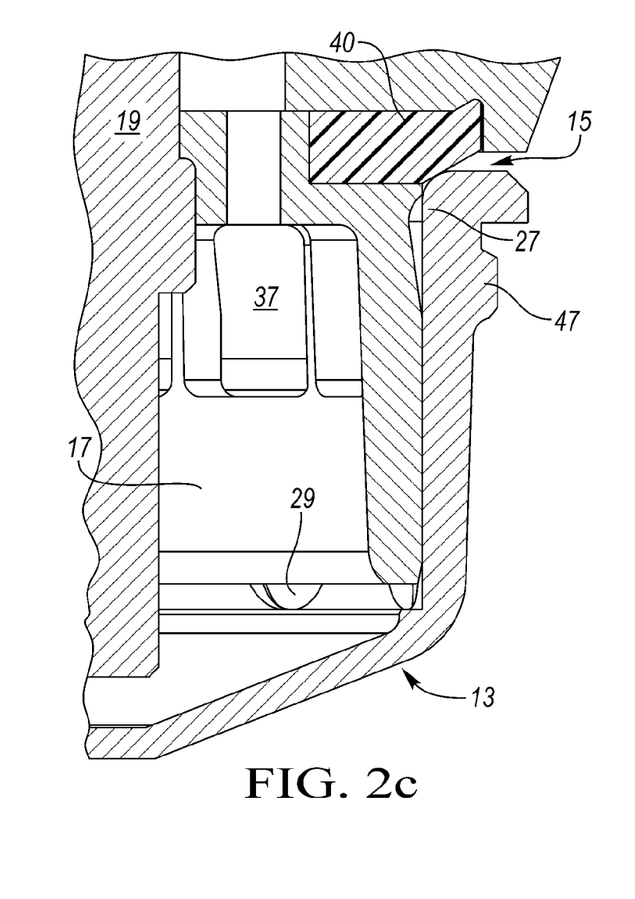

FIG. 2c illustrates the same partial view of the first and second energy dissipating means 15 and 13 in the state of the valve assembly 1 being completely closed. As can be clearly seen, the plane part 17 being part of the valve closing means now occludes the apertures 29 of the first energy dissipating means 13 except for a small remaining portion to allow smooth opening of the valve assembly. Further, the plane part 47 also being part of the valve closing means, of the first energy dissipating means 13 occludes the apertures 37 of the second energy dissipating means 15. Complete closing is achieved by the seal 40 coming to a rest on the circumferential wall 27 of the first energy dissipating means 13.

The effect of the design of the first energy dissipating means 13 on the pressure drop will now be explained.

Figure 2D:
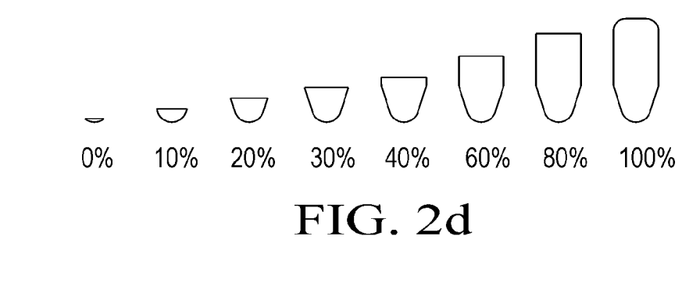

The shape of the apertures 29 of the first energy dissipating means 13 is chosen such that it's width in the lower part, e.g. w1, is smaller than its width w2 in the upper part as can be clearly seen in FIG. 2a. FIG. 2d illustrates the area of the open passage, thus the non occluded part of aperture 29 left open by the plain part 17 of the circumferential wall, for a plurality of opening degrees of the valve assembly 1. As can be seen from FIG. 2d, when the valve closes the reduction of the area of the open passage is linear in the range where the apertures have a rectangular shape (here from 100% to about 40%). In fact, for 100%, this linear relationship is not completely achieved which is due to the rounded upper corners of the apertures 29.

For opening degrees of less than 40%, the effect of the arc- or trapezoidal shaped lower part of the apertures 29 is such that the open passage closes faster than the opening degree of the valve assembly 1. This has the effect that for opening degrees close to the closed state, in particular in a range of 0-10%, more in particular in a range of 0-30%, a high pressure drop is absorbed at the first energy dissipating stage 13 as the fluid is forced to pass through a relatively small opening area compared to the design in the state of the art. As a consequence, a better distribution of the load loss/pressure drop is achieved in the critical state of a nearly closed valve. It appears that the design of the apertures in the first energy dissipation stage 13 alone, already improves the design such that less cavitations occur in the critical areas of the valve assembly.

As can be seen in FIG. 2d, the apertures 29 of the first energy dissipating means 13 still provide a small opening passage even at a completely closed valve assembly (opening degree 0%), which allows the establishment of the upstream pressure within the inner chamber defined by the first energy dissipating means 13 and thereby guarantees an immediate smooth opening of the valve assembly 1. The complete closing of the valve assembly such that no fluid can pass through anymore, is achieved by the additional seal 40.

The effect of the design of the second energy dissipating means 15 onto the pressure drop distribution over the first and the second stage 13 and 15 of the valve assembly 1 will now be described in detail.

Just like the amendment to the design of the apertures 29 compared to the prior art leads to an increased pressure drop at the first dissipation stage, also the amended design of the apertures 37 of the second energy dissipating stage 15 has an effect on the amount of pressure reduction at the first energy dissipating means 13. Indeed, the apertures 37 as well as the total design of the upper part 41 of the circumferential wall 35 facilitate the flow of the fluid towards the valve assembly outlet 7 even for low opening degrees of the total valve assembly 1, in particular for opening degrees of less than 30%, so that the second pressure of the fluid between the first and the second energy dissipating stage 13 and 15 can further reduce so that for all opening degrees of the valve assembly, a pressure drop in a range of 50% to 70% can be achieved.

FIG. 2b illustrates that in the upper part 41 towards the top wall 33 after second energy dissipating means 15, the circumference of the outer surface is smaller than the circumference in the lower part 43 of the circumferential wall 35, such that a clearance 51 can be observed between at least a part of the circumferential wall 35 of the second energy dissipating means 15 and the circumferential wall 27 of the first energy dissipating means 13. Thus, at the moment of opening the valve assembly 1, a fluid can pass over the entire circumference of the upper extremity of the circumferential wall 27 of the first energy dissipating means 13 towards the outlet thereby lowering the pressure in the space defined by the inner chambers of the first and second energy dissipating means 13 and 15.

As can be seen from FIG. 2a, the height h of the upper part 41 of the circumferential wall 35 represents about 60% of the total height H in the fully open state. Towards the seal 40, the exterior wall has a rounded shape in the side cut view with a radius r corresponding to the radius r in the rim region 31 of the first energy dissipating means 13. Further down, the exterior wall gradually recovers the circumference of the lower part 43, here in a linear way. In this embodiment, the material removal is thus such that immediately after opening of the valve assembly a rather large passage is opened for the fluid to flow towards the outlet, this is achieved with the rounded part of the upper part 41. Furthermore by gradually recovering the radius of the lower part 43, a smooth flow can be ensured for all opening degrees. Nevertheless, other geometries still fall under the invention, as long as a clearance is observed between the exterior wall of the second energy dissipating means and the interior wall of the first energy dissipating means, allowing the fluid to flow towards the outlet over essentially the entire circumference of wall 35.

FIG. 2b illustrates that the side walls 53a, 53b, and 53c of the apertures 37 of the second energy dissipating means 15 have been reinforced on the interior side to take into account the material removal on the exterior side in the upper part 41 to ensure the mechanical stability in this part of the valve assembly. In this embodiment the interior side of the wall of the second energy dissipating means 15 does not extend parallel to the wall 27 of the first energy dissipating means.

Furthermore, FIG. 2b shows the rounded lower extremity 45 of the circumferential wall 35 of the second energy dissipating means 15 which has the advantageous effect that the fluid flow arriving from the first energy dissipating means 13 smoothly can pass this lower extremity even for a nearly closed valve. This feature improves the $K_v$ value of the valve assembly 1 by about 3-5% compared to a design without a rounded lower extremity. In this context, the $K_v$ value is the volume flow in cubic meter/hour of water at the temperature between 5°-40° C. with a pressure drop across the valve of one bar, when the valve is completely opened. This advantage attached to the rounded extremity 45 is essentially independent of the effects of the design of the apertures of the first and second energy dissipating means 13 and 15.

By combining the advantages of the design of the apertures of the first energy dissipating stage 13 with the improved design around the apertures of the second energy dissipating stage 15, a numerical analysis has shown that for an opening degree between 10-100% of the valve assembly, the load loss at the first stage was in a range of 50% to 70% over the entire range. This has the advantage that the occurrence of cavitations in the critical area close to the housing 3 at the exit of the apertures 37 of the second energy dissipating stage 15 can be reduced to thereby enhance the lifetime of the valve assembly. As most of the pressure drop is achieved at the first energy dissipation stage, most of the damage may arise inside the first or second energy dissipating means 13 and 15 which can easily be exchanged.

As occurrence of cavitations close to the housing can be reduced compared to the prior art as described above, it is also possible to provide the apertures 37 in the second energy dissipating stage under a 90° angle with respect to the circumferential wall so that no special machining and alignment of the circumferential wall like in the prior art valve assembly with its non-radially arranged slits as discussed above needs to be carried out.

Figure 3:
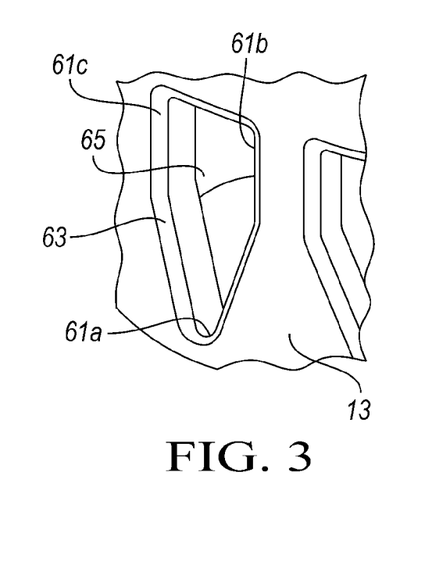
FIG. 3 shows a detailed view of one aperture of the first energy dissipating means according to a second embodiment of the invention.

FIG. 3 illustrates a detailed view of aperture 29 of the first energy dissipating means 13 according to a second embodiment. Not only the corner regions 61a, 61b and 61c of the aperture 29 are rounded, but also the edges of the aperture 29 on the exterior side 63, but also on the interior side 65 of the aperture 29. These rounded edges also have the advantageous effect that the valve flow coefficient $K_v$ can be improved by up to about 6%. Again, this advantage can be achieved independently of the design of the apertures.

The invention has been described for a valve assembly 1 wherein both the first and the second energy dissipating means 13 and 15 represent an improved design. According to further variants of the inventive embodiments, a valve assembly can be provided wherein the first energy dissipating means 13 alone or the second energy dissipating means 15 alone is realized with the improved aperture design compared to the above described prior art (valve assembly). Furthermore, the number of apertures for the first and the second energy dissipating means like in the embodiment described above, do not have to be the same. According to yet another variant, the apertures 29 and 37 of the first and the second energy dissipation means 13 and 15 do not necessarily have to be aligned like illustrated in FIGS. 1, 2a and 2b.

The invention claimed is:

1. A valve assembly comprising:
   a first energy dissipating means with a plurality of apertures for reducing the pressure of a fluid from a first pressure to a second lower pressure;
   a second energy dissipating means with a plurality of apertures for reducing the fluid pressure from the second pressure to a third pressure lower than the second pressure; and
   a valve closing means for opening and closing the valve assembly;
   wherein the valve closing means is configured to continuously or gradually occlude the plurality of apertures of the first energy dissipating means when closing the valve assembly, wherein at least one of the apertures of the first energy dissipating means is shaped such that a width in a lower part of the at least one aperture is smaller than a width in an upper part of the at least one aperture, such that, when closing the valve assembly, movement of the valve closing means in uniform increments results in non-uniform reductions in open passage area of the at least one aperture at least for a predetermined movement range of the valve closing means, and wherein the at least one aperture is configured such that the at least one aperture remains partially open when the valve assembly is closed.

2. The valve assembly according to claim 1, wherein the first energy dissipating means comprises a valve seat including a bottom wall, and a circumferential wall extending upwardly from the bottom wall and defining an inner chamber, and wherein the plurality of apertures of the first energy dissipating means includes a plurality of slots formed in a lower part of the circumferential wall.

3. The valve assembly according to claim 2 wherein a lower part of at least one of the plurality of slots is formed as an arc or has two inwardly angled sides.

4. The valve assembly according to claim 3 wherein the lower part of the at least one of the plurality of slots is formed as a parabolic arc.

5. The valve assembly according to claim 2 wherein an upper part of at least one of the plurality of slots has an essentially rectangular shape.

6. The valve assembly according to claim 2 wherein corners of at least one of the plurality of slots are rounded.

7. The valve assembly according to claim 2 wherein edges of at least one of the plurality of slots on an exterior and/or interior side of the circumferential wall are rounded.

8. The valve assembly according to claim 2 wherein the second energy dissipating means comprises a disc guide having a top wall, and a circumferential wall extending downwardly from the top wall and defining an inner chamber, and wherein the plurality of apertures of the second energy dissipating means includes a plurality of slots formed in an upper part of the circumferential wall of the disc guide.

9. The valve assembly according to 8 wherein the circumferential wall of the first energy dissipating means comprises a non-slotted upper part and the circumferential wall of the second energy dissipating means comprises a non-slotted lower part, and wherein the non-slotted upper and lower parts form the valve closing means.

10. The valve assembly according to claim 1 wherein the predetermined range of opening degrees of the total valve assembly is 0% to 10%.

11. The valve assembly according to claim 1 wherein the predetermined range of opening degrees of the total valve assembly is 0% to 30%.

12. A valve assembly comprising:
    a first energy dissipating means with a plurality of apertures for reducing pressure of a fluid from a first pressure to a second lower pressure;
    a second energy dissipating means with a plurality of apertures for reducing the fluid pressure from the second pressure to a third pressure lower than the second pressure; and
    a valve closing means for opening and closing the valve assembly;
    wherein the valve closing means comprises a first wall element and the second energy dissipating means comprises a second wall element in which the plurality of apertures of the second energy dissipating means are provided, and the first wall element is configured to continuously or gradually occlude the plurality of apertures of the second energy dissipating means when closing the valve assembly, wherein the first and second wall elements are configured and arranged such that in a closed state of the valve assembly a clearance is formed between the first and second wall elements, and wherein at least one of the apertures of the first energy dissipating means is shaped such that a width in a lower part of the at least one aperture is smaller than a width in an upper part of the at least one aperture, and the at least one aperture is configured such that the at least one aperture remains partially open when the valve assembly is closed.

13. The valve assembly according to claim 12 wherein the second energy dissipating means comprises a valve disc guide having a top wall, and a circumferential wall extending downwardly from the top wall and defining an inner chamber, and wherein the second wall element comprises the circumferential wall, and the plurality of apertures of the second energy dissipating means includes a plurality of slots formed in an upper part of the circumferential wall.

14. The valve assembly according to claim 13, wherein circumference of the circumferential wall is smaller in an upper part of the circumferential wall than in a lower part of the circumferential wall to provide clearance between the circumferential wall and the first energy dissipating means in the closed state of the valve assembly.

15. The valve assembly according to claim 13 wherein the apertures of the second energy dissipating means are formed such that they extend perpendicular with respect to a surface of the circumferential wall.

16. The valve assembly according to claim 13 wherein the circumferential wall of the second energy dissipating means comprises a non-slotted lower part, and the non-slotted lower part forms part of the valve closing means.

17. The valve assembly according to claim 16, wherein the non-slotted lower part of the circumferential wall has a rounded extremity on its interior side.

18. The valve assembly according to claim 17 wherein the rounded extremity is according to an arc of a circle.

19. The valve assembly according to claim 16 wherein the first energy dissipating means comprises a valve seat including a bottom wall, and a circumferential wall extending upwardly from the bottom wall and defining an inner chamber, the circumferential wall of the valve seat including a non-slotted upper part, and wherein the plurality of apertures of the first energy dissipating means includes a plurality of slots formed in a lower part of the circumferential wall of the valve seat, and at least one slot of the valve seat has a smaller width in its lower part than in its upper part.

20. A valve assembly according to claim 19 further comprising a housing with a fluid inlet and a fluid outlet, and wherein
- the valve seat is arranged between the fluid inlet and the fluid outlet and fixed to the housing,
- the disc guide is slidably arranged in the valve seat,
- the non-slotted lower part of the circumferential wall of the disc guide is adapted to substantially occlude the plurality of slots of the valve seat in the closed state of the valve assembly, thereby preventing fluid from passing from the fluid inlet to the fluid outlet, and the non-slotted upper part of the circumferential wall of the valve seat is adapted to substantially occlude the plurality of slots of the disc guide in the closed state of the valve assembly, to thereby prevent fluid from passing from the fluid inlet to the fluid outlet, and
- the disc guide is slidably movable into an open position of the valve assembly, thereby letting fluid through the valve assembly from the fluid inlet to the fluid outlet.

21. The valve assembly according to claim 20 wherein the slots of the disc guide are wider than the slots of the valve seat.

22. A valve assembly comprising:
- a first energy dissipating means with a plurality of apertures for reducing pressure of a fluid from a first pressure to a second lower pressure:
- a second energy dissipating means with a plurality of apertures for reducing the fluid pressure from the second pressure to a third pressure lower than the second pressure; and
- a valve closing means for opening and closing the valve assembly;
- wherein geometry of the plurality of apertures of the first energy dissipating means and geometry of the plurality of apertures of the second energy dissipating means are such that independently of opening degree of the valve assembly, the pressure reduction achievable at the first energy dissipating means is at least 50% of the pressure reduction from the first pressure to the third pressure, and wherein at least one of the apertures of the first energy dissipating means is shaped such that a width in a lower part of the at least one aperture is smaller than a width in an upper part of the at least one aperture, and the at least one aperture is configured such that the at least one aperture remains partially open when the valve assembly is closed.

23. The valve assembly according to claim 22 wherein the plurality of apertures of the first energy dissipating means and the plurality of apertures of the second energy dissipating means are configured such that the pressure reduction achievable at the first energy dissipating means is in a range of 50 to 70% of the pressure reduction from the first pressure to the third pressure when the opening degree of the valve assembly is in an opening range of at least 10 to 100%.

24. The valve assembly according to claim 22 wherein the second energy dissipating means is movable with respect to the first energy dissipating means.

* * * * *